(12) United States Patent
Denker et al.

(10) Patent No.: US 9,121,374 B2
(45) Date of Patent: Sep. 1, 2015

(54) WIDE-BAND DAMPER FOR CHARGE AIR LINES OF AN INTERNAL COMBUSTION ENGINE WITH TURBOCHARGER

(75) Inventors: Dietrich Denker, Ostfildern (DE); Stefan Huth, Solingen (DE)

(73) Assignee: UMFOTEC UMFORMTECHNIK GMBH (DE)

( * ) Notice: Subject to any disclaimer, the term of this patent is extended or adjusted under 35 U.S.C. 154(b) by 330 days.

(21) Appl. No.: 13/880,196

(22) PCT Filed: Oct. 21, 2011

(86) PCT No.: PCT/EP2011/068441
§ 371 (c)(1),
(2), (4) Date: Jun. 26, 2013

(87) PCT Pub. No.: WO2012/052548
PCT Pub. Date: Apr. 26, 2012

(65) Prior Publication Data
US 2013/0263822 A1    Oct. 10, 2013

(30) Foreign Application Priority Data
Oct. 22, 2010   (DE) .................. 10 2010 042 789

(51) Int. Cl.
*F02M 35/12*   (2006.01)
*F02M 35/10*   (2006.01)
*F16L 55/033*  (2006.01)

(52) U.S. Cl.
CPC ..... *F02M 35/10295* (2013.01); *F02M 35/1261* (2013.01); *F02M 35/1266* (2013.01); *F16L 55/0331* (2013.01)

(58) Field of Classification Search
CPC .............. F02M 35/12; F02M 35/1255; F02M 35/1261; F02M 35/1266; F02M 35/10295
USPC .......................... 123/184.53, 184.57; 181/229
See application file for complete search history.

(56) References Cited

U.S. PATENT DOCUMENTS

| 2,308,886 A | 1/1943 | Mason |
| 3,187,837 A | 6/1965 | Beeching |
| 6,508,331 B1 * | 1/2003 | Stuart ........................... 181/250 |

(Continued)

FOREIGN PATENT DOCUMENTS

| DE | 199 43 246 A1 | 3/2001 |
| DE | 103 17 224 A1 | 11/2004 |

(Continued)

OTHER PUBLICATIONS

International Search Report for International Application No. PCT/EP2011/068441, mailed May 24, 2012.

*Primary Examiner* — Hai Huynh
(74) *Attorney, Agent, or Firm* — McCarter & English, LLP

(57) ABSTRACT

A wide-band damper is designed for charge air lines of an internal combustion engine with turbocharger. The wide-band damper has an inlet and an outlet. Proceeding from the inlet, at least three slot chambers are arranged axially in series. The slot chambers are dimensioned for different frequencies f1, f2 and f3. At least three gap chambers are provided, which are arranged axially in series and axially downstream of the at least three slot chambers. The gap chambers are dimensioned for different frequencies f6, f7 and f8. Each of the frequencies f1, f2 and f3 of the slot chambers is lower than each of the frequencies f6, f7 and f8 of the gap chambers.

15 Claims, 1 Drawing Sheet

(56) References Cited

U.S. PATENT DOCUMENTS

| | | | |
|---|---|---|---|
| 6,715,580 B1 * | 4/2004 | Gerstner et al. | 181/224 |
| 6,983,820 B2 * | 1/2006 | Boast et al. | 181/249 |
| 7,584,821 B2 * | 9/2009 | Prior et al. | 181/241 |
| 7,810,609 B2 * | 10/2010 | Sikes et al. | 181/250 |
| 7,905,319 B2 * | 3/2011 | Sullivan | 181/250 |
| 7,934,581 B2 * | 5/2011 | Kim et al. | 181/250 |
| 8,177,024 B2 * | 5/2012 | Caliskan | 181/250 |
| 8,327,975 B2 * | 12/2012 | Ortman et al. | 181/264 |
| 8,348,012 B2 * | 1/2013 | Hwang | 181/229 |
| 8,408,357 B2 * | 4/2013 | Cheung | 181/224 |
| 8,701,635 B2 * | 4/2014 | Simons et al. | 123/559.1 |
| 9,010,485 B2 * | 4/2015 | Bornemann et al. | 181/212 |

FOREIGN PATENT DOCUMENTS

| | | |
|---|---|---|
| DE | 19 855 708 B4 | 4/2009 |
| DE | 10 2008 032 491 A1 | 1/2010 |
| EP | 1 469 186 A2 | 10/2004 |

* cited by examiner

WIDE-BAND DAMPER FOR CHARGE AIR LINES OF AN INTERNAL COMBUSTION ENGINE WITH TURBOCHARGER

CROSS-REFERENCE TO RELATED APPLICATIONS

This application is the U.S. National Phase of International Application No. PCT/EP2011/068441, filed Oct. 21, 2011, which, in turn, claims the benefit of German Application No. DE 10 2010 042 789.6, filed Oct. 22, 2010. The contents of both of these applications are hereby incorporated by reference in their entirety as part of the present disclosure.

FIELD OF THE INVENTION

The invention relates to a wide-band damper for charge air lines of an internal combustion engine that has a turbocharger. The wide-band damper, which is disposed, in particular, behind the turbocharger, comprises an inlet, an outlet and at least one slit chamber disposed between the inlet and the outlet.

BACKGROUND OF THE INVENTION

Such a damper or insulator is known from DE 198 55 708 B4. This damper has proved itself in practice but is not sufficiently wide-band. Hereinafter, a damper is considered to be wide-band which has a damping effect above a threshold value, for example above 20 dB, between a lower frequency fu and an upper frequency fo, and in which the upper frequency fo is at least three times the lower frequency fu, in particular at least four times, preferably five times. This damping effect is supposed to be provided under operating conditions.

Internal combustion engines with turbochargers, particularly injection engines with turbochargers, are increasingly used in automobile engineering. This leads to engines with an ever smaller cubic capacity and thus, ever smaller dimensions. Thus, the construction spaces also become smaller and the space available for sound insulation becomes increasingly smaller.

The operating noises emitted by the engine are to comply with predefined requirements and conceptions; a good sound of the engine is desired. In the case of turbocharged engines, noises occur due the splitting of charge air within the turbocharger with further noises added to that. In particular, noises that lie within the human auditory range are supposed to be dampened as much as possible; a desired noise emission is to be accomplished. In this case, the engine developers increasingly demand sound reductions over wide frequency ranges, for example in the range of from 2000 to 10000 Hz, with the smallest of construction spaces being provided.

The known damper is configured as a tubular chamber damper which comprises two slit chambers axially disposed one behind the other. With it, the required minimum damping effect can be achieved only in a smaller frequency range.

Thus, a damping effect in a sufficiently wide frequency range with as small a design as possible is desired. The damper is supposed to be inexpensive to manufacture and is supposed to be capable of being assembled from components that are easy to produce and mount. Metal and/or suitable plastics are possible materials. A working temperature of 180° C. and above and a pressure of usually 1.8 bar in the damper are to be taken into account.

SUMMARY OF THE INVENTION

It is therefore the object of the invention to improve the known damper and to develop it further in such a way that it is designed for a wider frequency range, wherein the dimensions are to be kept as small as possible.

This object is accomplished by a damper for charge air lines of an internal combustion engine, which has a turbocharger. The damper, which is a wide-band damper, comprises an inlet, an outlet, at least three slit chambers disposed axially one behind the other between the inlet and the outlet, the slit chambers each being dimensioned to dampen or insulate different frequencies f1, f2 and f3, and at least three gap chambers disposed axially one behind the other and axially between the slit chambers and the outlet, the gap chambers each being dimensioned to dampen or insulate different frequencies f6, f7 and f8, wherein each of the frequencies f1, f2 and f3 of the slit chambers is lower than each of the frequencies f6, f7 and f8 of the gap chambers.

By combining attuned slit chambers and attuned gap chambers disposed behind them, a wide-band damper is obtained which provides a minimum damping effect of 20 dB and above for a frequency ratio of fo/fu≥4, for example in the region of 5. The frequency range is, for example, 2000 Hz to 10000 Hz. Starting at the inlet, the volumes of the hollow chambers of the individual slit chambers become progressively smaller. Each slit chamber is designed for its own frequency. At least three gap chambers are disposed behind the at least three slit chambers. Also in their case, the volumes delimited by the cavities of the gap chambers gradually decrease towards the outlet. The assembly of the slit chambers is provided for damping in a lower partial range of the frequency of the damping range, for example from 2000 to 6000 Hz. The assembly of the gap chambers is provided for damping in an upper partial range of the damping range, for example in the range 6000 to 10000 Hz. The frequency 6000 Hz is referred to as the transition frequency; it can also assume values other than the one specified. It lies between the frequency of the gap chamber with the largest volume and the frequency of the slit chamber with the smallest volume.

In a kinematic reversal, it is also possible to reverse the order of the inlet and outlet. In this case, the design remains the same, only the direction of the flow through the damper is changed.

By combining several slit chambers and several gap chambers, a hitherto unknown, extremely good insulation that is continuously wide with regard to the frequency position is obtained.

A slit chamber is understood to be a resonator having a slit and a hollow chamber. Via the slit, the hollow chamber is connected with an inner space of the damper and accessible. The slit extends over only a small part of the axial length over which the hollow chamber extends, for example less than 20%, in particular less than 10% of the axial length of the hollow chamber. Slit chambers are also referred to as Helmholtz resonators. Gap chambers are understood to be resonators having a gap and a cavity. The cavity is accessible over its entire axial length via the gap. Gap chambers are also referred to as lambda/4 resonators. Lambda is the wavelength.

Preferably, gap chambers are configured as corrugated chambers. They can be realized by a corrugated tube that tapers, for example tapers conically, from the inlet towards the outlet. A channel of the inner space extends between the inlet and outlet. It is defined by a cylinder. The channel communicates with the slits and the gaps. They each preferably extend over 360°.

Preferably, the channel is formed in the region of the slit chambers by an internal tube. At the gap chamber assembly, the channel is preferably delimited by ribs of a corrugated tube.

It is possible to configure the corrugated tube in such a way that it is flexible, i.e. behaves like a bellows, for example a metallic bellows. Thus, movements of the outlet relative to the inlet are possible, for example in the range of from 10 to 20 mm transverse to the axis, or 10 degrees or up to 20 degrees of deviation of the inlet axis from the outlet axis.

The wide-band damper is preferably straight, so that its axis runs through in a straight line. However, it may also be curved. In particular, the inlet and outlet can extend relative to one another at an angle exceeding 10°, preferably exceeding 20°.

Other advantages and features become apparent from the following description of exemplary embodiments of the invention, which shall be understood not to be limiting and which will be explained below with reference to the drawings.

DETAILED DESCRIPTION OF EMBODIMENTS OF THE INVENTION

Figure 1:
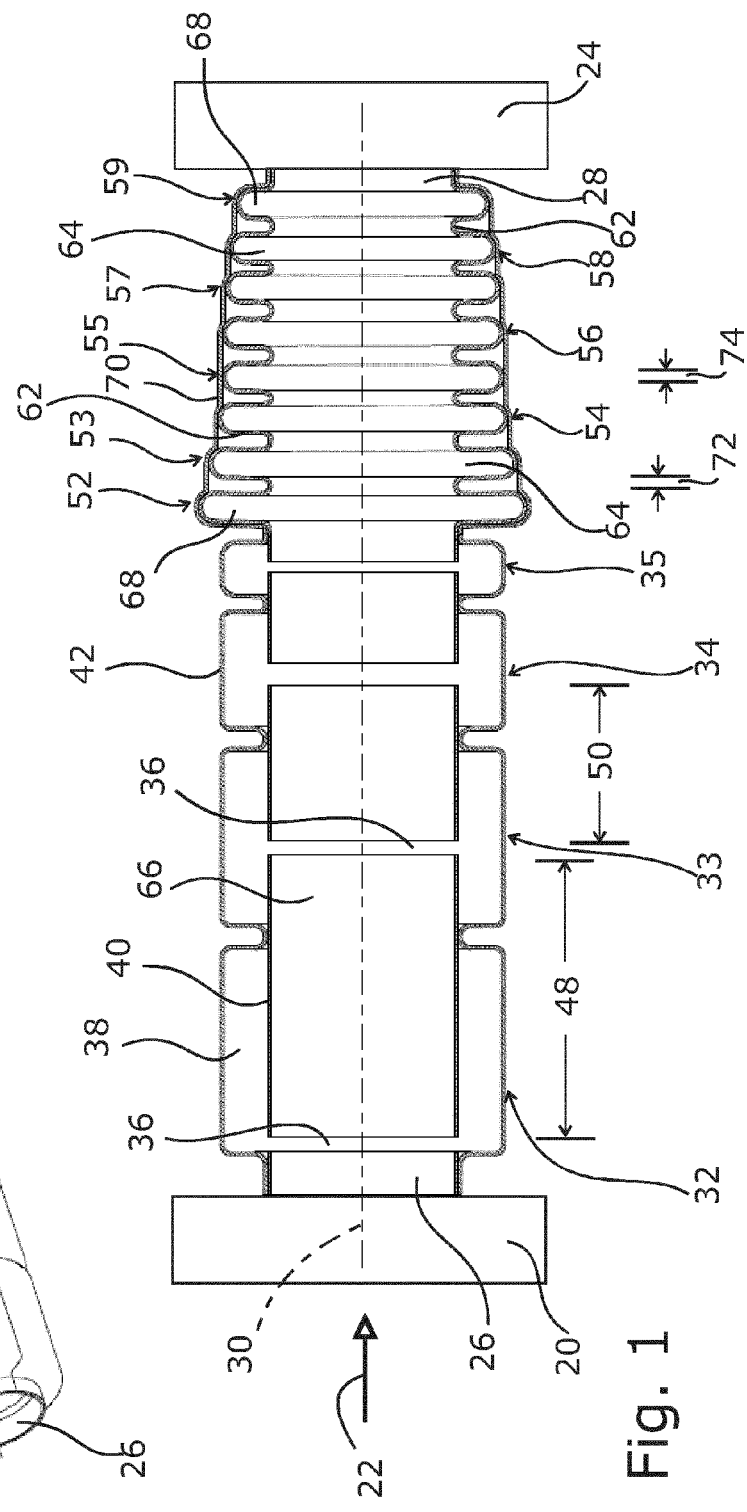
FIG. 1 shows an axial cross-sectional view of a tubular chamber damper.
Figure 2:
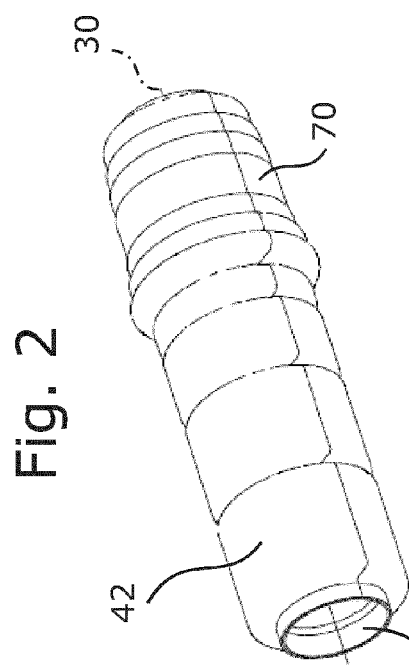
FIG. 2 shows a perspective view of the tubular chamber damper according to FIG. 1.

Indicated schematically, FIG. 1 shows a turbocharger 20 with air flowing into it in accordance with the arrow 22. The compressed air flows through a wide-band damper into an internal combustion engine 24. The wide-band damper is a part of a charge air line. Further components of the charge air line can be provided between the turbocharger 20 and the internal combustion engine 24. The damper can also be disposed in a charge air line disposed forward of the turbocharger 20.

The wide-band damper comprises an inlet 26 and an outlet 28. It is configured to be straight, and has an axis line 30 that extends in a straight line.

In the description of the wide-band damper, the term "front" is used for an object that is closer to the inlet 26 than a part compared therewith. Thus, this is put in relation to the direction of the flow according to the arrow 22.

The wide-band damper comprises four slit chambers 32-35 disposed axially one behind the other. Each slit chamber 32-35 comprises a gap 36 and a hollow chamber 38. Each slit chamber 32-35 is delimited by an internal tube 40, an external tube 42 and radial walls. The internal tube 40 is a cylindrical tube. It consists of a total of four sections. The first three slits 36 are formed between these sections; the fourth slit 36 is formed between the last section and a corrugated tube 44. The slots 36 each extend over 360° and each have a constant width, measured in the axial direction.

With regard to its cross-section, the external tube 42 is configured similar to a rectangular curve. It is respectively connected to each of the sections of the internal tube 40, so that a stable unit is obtained. The external tube 42 also forms the radial walls 46. Two radial walls 46 respectively delimit one of the slit chambers 32 to 35 in the axial direction. In this case, adjacent slit chambers 32 to 35 do not have the same radial wall, but rather separate radial walls 46. The leads to a better decoupling effect. However, it is also possible to provide a common radial wall 46 for adjacent slit chambers 32 to 35.

Each slit chamber 32 to 35 is designed for a different frequency. It can be seen that the slit chambers 32 to 35, seen from the inlet 26 towards the outlet 28, increasingly delimit a smaller volume.

The slit chambers also differ in the axial length of their slits 36. Whereas the first slit chamber 32 has a slit 36 that is aligned with the first radial wall 46 and is thus located as close as is at all possible to the inlet 26, the slit 36 of the second slit chamber 33 lies more in the center of the hollow chamber 38, but still on the inlet side. This is continued in the same way in the case of the further slit chambers 34 and 35.

A clear distance 48 between the slits 36 of the first slit chamber 32 and the second slit chamber 33 is drawn into FIG. 1. A clear distance 50 between the slits 36 of the second slit chamber 33 and the third slit chamber 34 is also drawn in. It can be seen that the clear distance 48 is larger than the clear distance 50. This is also continued in this way for the further slit chambers 34, 35; the clear distance between slits 36 of adjacent slit chambers decreases, seen from the inlet 26.

The first slit chamber 32 is designed for a frequency f1, the second slit chamber 33 is designed for a frequency f2, and so on. The frequency f1 is lower than the frequency f2, the frequency f2 is lower than the frequency f3, and the frequency f3 is lower than the frequency f4.

The slit chambers 32 to 35 have slits 36 of a simple configuration. They can also have slits of a more complicated configuration, such as is known, for example, from DE 10 2008 032 491 A1 by the Applicants. This application is incorporated with its entire content of disclosure into the present patent application.

The inlet 26 is formed jointly by the internal tube 40 and the external tube 42.

In the axial direction, the slits 36 have a width that is less than 10% of the axial length of the associated hollow chamber 38. This applies, for example, to the first slit chamber 32. In the case of the third slit chamber 33, the slit width is less than 20% of the axial length of the hollow chamber 38. The other slit chambers are located therebetween.

The assembly consisting of the four slit chambers 32 to 35 is responsible for insulating a lower frequency range for which the wide-band damper is designed, for example in the range from 2000 to 6000 Hz.

An assembly of eight gap chambers 52 to 59 follows behind this assembly consisting of the four slit chambers 32 to 35. The assembly consisting of the eight gap chambers 52 to 59 is responsible for insulating an upper frequency range for which the wide-band damper is designed, for example in the range from 6000 to 10000 Hz. The gap chambers 52 to 59 are formed by a corrugated tube 62 composed of inner semi-circular members, radial discs and outer semi-circular members. Each gap chamber 52 to 59 comprises a gap 64 that communicates with a channel 66 delimited by the inner semi-circular members. On the side of the slit chambers 32 to 35, the channel 66 is delimited by the internal tube 40. The above-described inner semi-circular members of the corrugated tube 32 lie in the extension of the internal tube 40. Each gap chamber 52 to 59 moreover comprises a hollow chamber 68. The volumes of the hollow chambers 68 of all gap chambers 52 to 59 is different in each case. The volume decreases gradually from the inlet 26 towards the outlet 28; its axial width remains largely, within 20%, constant. Accordingly, the outer contour of the corrugated tube 32 does not lie on a cylinder jacket but converges towards the outlet 28; for example, it is conical. Therefore, whereas the gaps 64 of all gap chambers 52 to 59 lie in the extension of the internal tube 40, the point of greatest distance of each hollow chamber 68 from the axis line 30 has a different value for each gap chamber 52 to 59; the value decreases in steps from the first gap chamber 52 towards the last gap chamber 59.

A jacket tube 70 is provided which reaches over the outer regions of the corrugated tube 62 and is connected thereto. A stable assembly in the region of the gap chambers 52 to 59 is thus obtained. It is also possible to configure this jacket tube 70 integrally with the external tube 42. It is also possible to dispense with the jacket tube 70. The latter is advantageous in that the corrugated tube 62 can have a certain elasticity; thus, the outlet 28 can be displaced transversely to the axis line 30.

The axial width of all gaps 64 of the gap chambers 52 to 59 is substantially identical for all gap chambers 52 to 59. The clear distance between two gap chambers is drawn into FIG. 1 as a measure 72 for the distance between the first gap chamber 52 and the second gap chamber 53 and as a measure 74 for the clear distance between the fourth gap chamber 55 and the fifth gap chamber 56. It can be seen that the clear distances are substantially identical, in any case deviate from one another by maximally 30%, for all gap chambers 52 to 59.

The gap chambers 52 to 59 are designed for different frequencies. The frequency values increase from the first gap chamber 52 with the frequency f6 to the second frequency 53 with the frequency f7 etc. towards the last gap chamber 59.

Applicants reserve the right to combine any features and sub-features from the claims, particularly from the sub-claims, and any features and sub-features from the description, with one another in any form, and possibly derive new claims therefrom.

The invention claimed is:

1. A wide-band damper for charge air lines of an internal combustion engine having a turbocharger, the wide-band damper, comprising:
   an inlet;
   an outlet;
   at least three slit chambers disposed axially one behind the other between the inlet and the outlet, the slit chambers each being dimensioned to dampen or insulate different frequencies f1, f2 and f3; and
   at least three gap chambers disposed axially one behind the other and axially between the slit chambers and the outlet, the gap chambers each being dimensioned to dampen or insulate different frequencies f6, f7 and f8, wherein each of the frequencies f1, f2 and f3 of the slit chambers is lower than each of the frequencies f6, f7 and f8 of the gap chambers.

2. The wide-band damper according to claim 1, wherein the frequencies for which the slit chambers and the gap chambers are dimensioned each increase from the inlet towards the outlet, so that, for slit or gap chambers that are adjacent to each other, the chamber that is located closer to the outlet has a higher frequency than the other chamber.

3. The wide-band damper according to claim 1, wherein each of the slit chambers comprises a slit and each of the gap chambers comprises a gap, and at least one of (1) a distance between the gaps of two of the gap chambers adjacent to each other, in an axial direction, is smaller than an axial width of each gap of the two adjacent gap chambers, and (2) distances between the slits, in the axial direction away from the inlet, become gradually smaller.

4. The wide-band damper according to claim 3, wherein each slit chamber comprises a cavity and, with respect to said slits that are among an adjacent two of the slit chambers, the slit of the slit chamber that is closer to the inlet is positioned closer to an inlet-side end of the cavity of that slit chamber.

5. The wide-band damper according to claim 4, wherein the slit of the first slit chamber facing the inlet is located in an immediate vicinity of an entry-side radial wall of the cavity.

6. The wide-band damper according to claim 1, wherein the gap chambers have a rounded profile.

7. The wide-band damper according to claim 1, further comprising a jacket tube, which extends at least over outer regions of the gap chambers.

8. The wide-band damper according to claim 1, wherein a distance in an axial direction between any adjacent two of the gap chambers is substantially identical.

9. The wide-band damper according to claim 1, wherein a total number of the gap chambers is greater by at least two than a total number of the slit chambers.

10. The wide-band damper according to claim 1, wherein the gap chambers are fabricated integrally from a corrugated tube with outer dimensions that decrease in a direction from the inlet towards the outlet.

11. The wide-band damper according to claim 1, wherein the gap chambers have a rounded profile that is configured as a corrugated profile.

12. The wide-band damper according to claim 1, wherein a distance in an axial direction between any adjacent two of the gap chambers deviates from a distance in an axial direction of any other adjacent two of the gap chambers by no more than about 30%.

13. The wide-band damper according to claim 1, wherein a total number of the gap chambers is greater by at least three than a total number of the slit chambers.

14. The wide-band damper according to claim 1, wherein the turbocharger is arranged behind the wide-band damper.

15. The wide-band damper according to claim 1, wherein the turbocharger is arranged in front of the wide-band damper.

* * * * *